Figure 3:
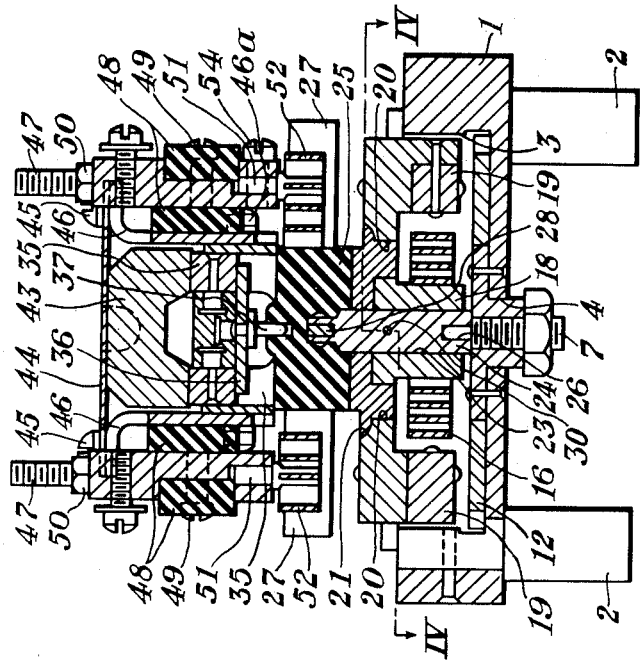

Feb. 5, 1952  C. S. SNAVELY  2,584,749
ELECTRICAL RELAY
Filed Aug. 28, 1947  6 Sheets-Sheet 1
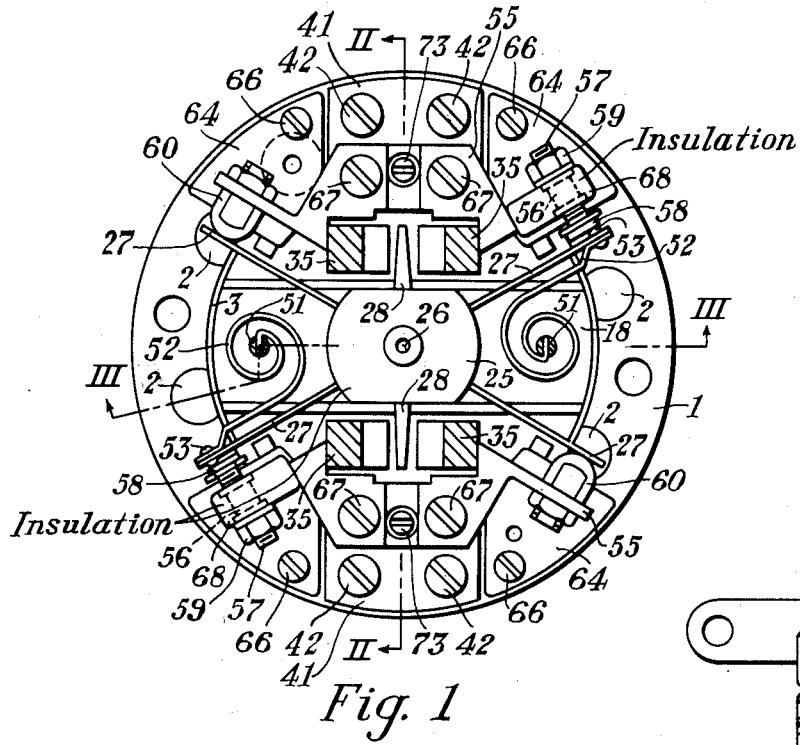
Fig. 1
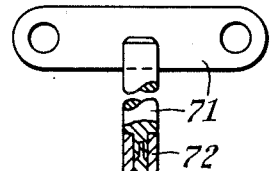
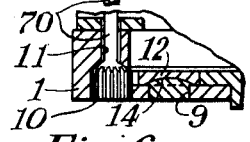
Fig. 6
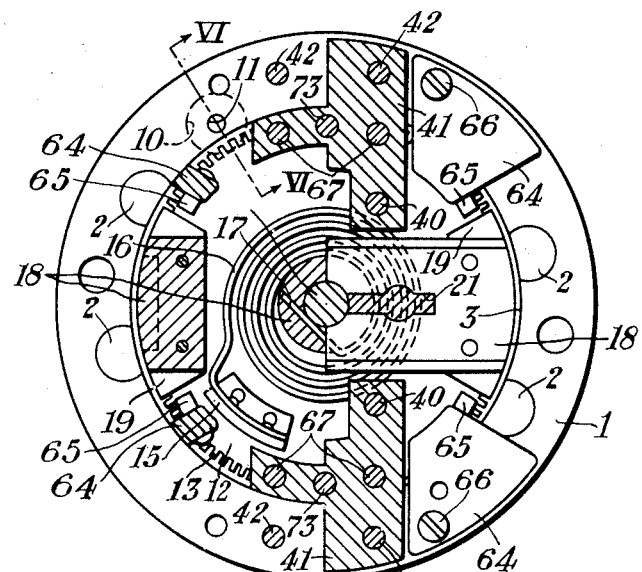
Fig. 4
INVENTOR.
Clarence S. Snavely
BY
HIS ATTORNEY INVENTOR.
Clarence S. Snavely
BY
HIS ATTORNEY Feb. 5, 1952  C. S. SNAVELY  2,584,749
ELECTRICAL RELAY
Filed Aug. 28, 1947  6 Sheets-Sheet 3
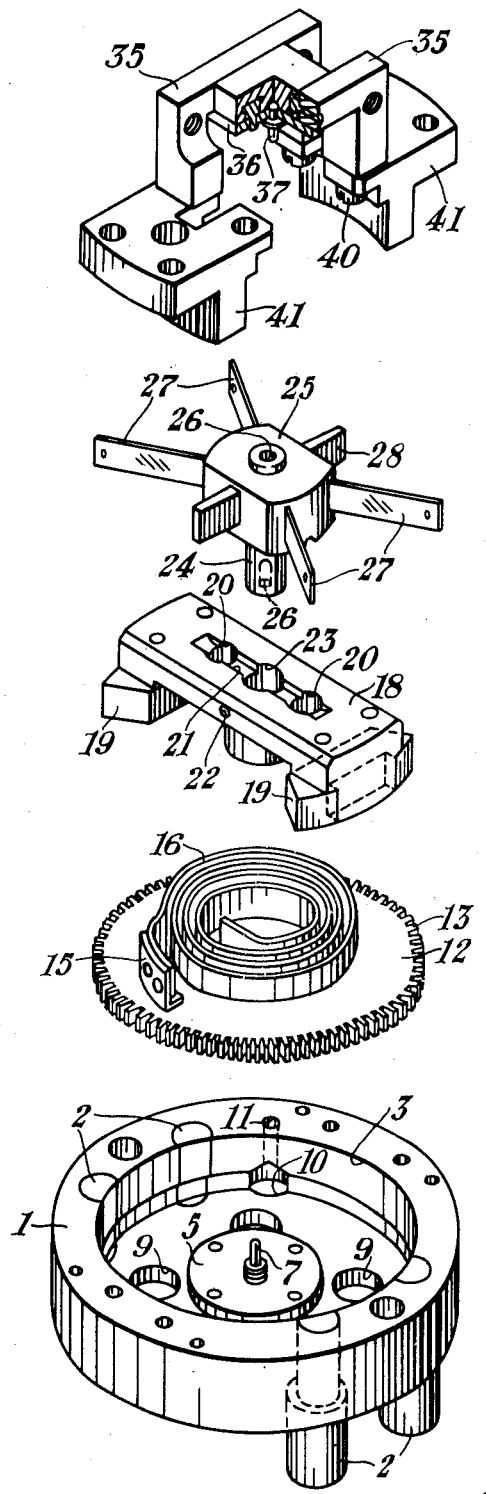
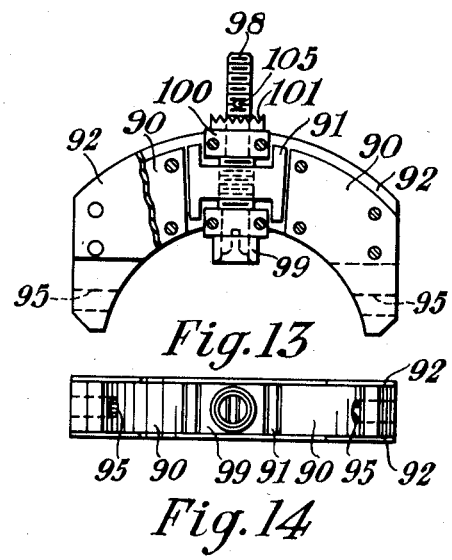
Fig. 13
Fig. 14
Fig. 5
INVENTOR.
Clarence S. Snavely
BY
HIS ATTORNEY Feb. 5, 1952 — C. S. SNAVELY — 2,584,749
ELECTRICAL RELAY
Filed Aug. 28, 1947 — 6 Sheets-Sheet 4
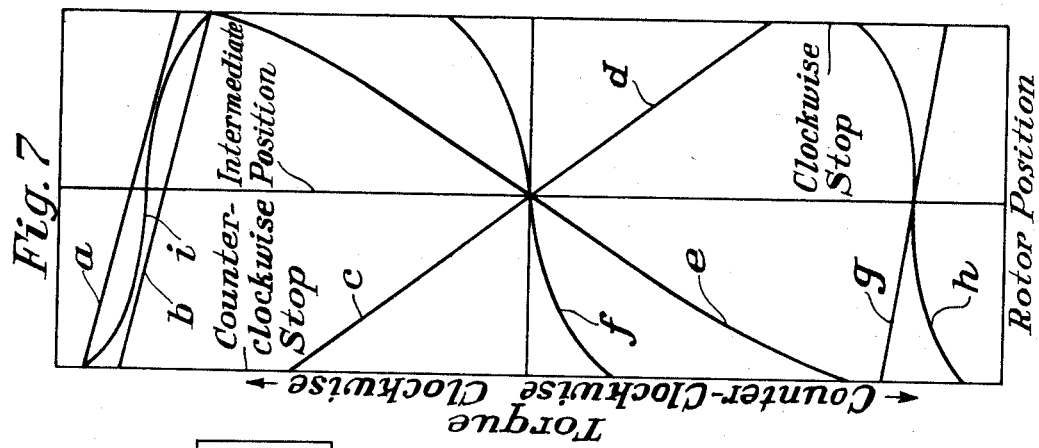
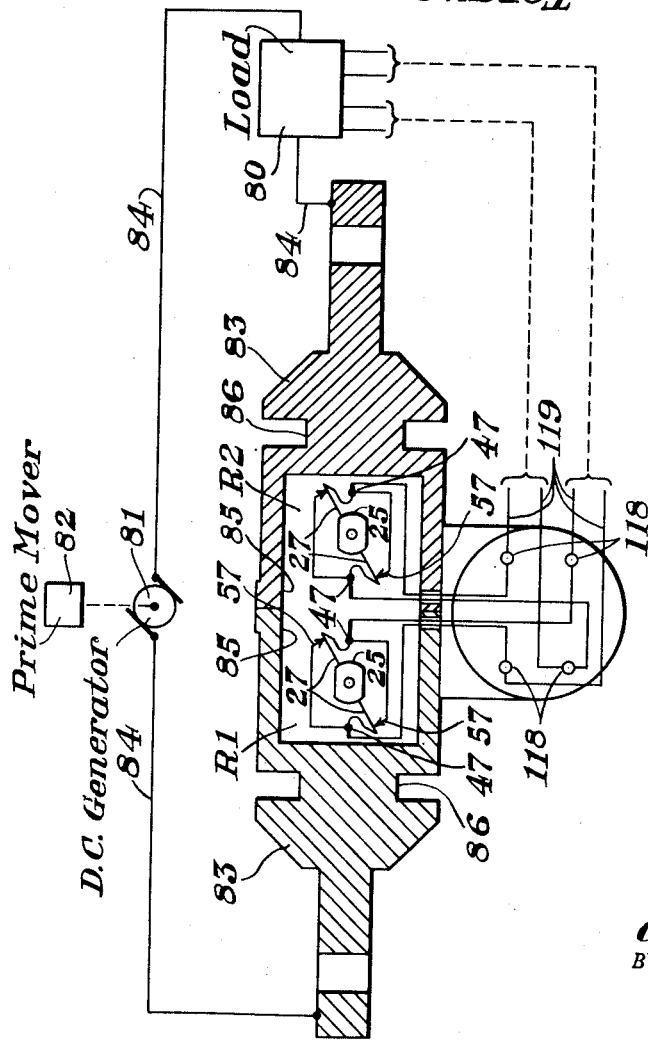
INVENTOR.
Clarence S. Snavely
BY
HIS ATTORNEY Feb. 5, 1952
C. S. SNAVELY
2,584,749
ELECTRICAL RELAY
Filed Aug. 28, 1947
6 Sheets-Sheet 5
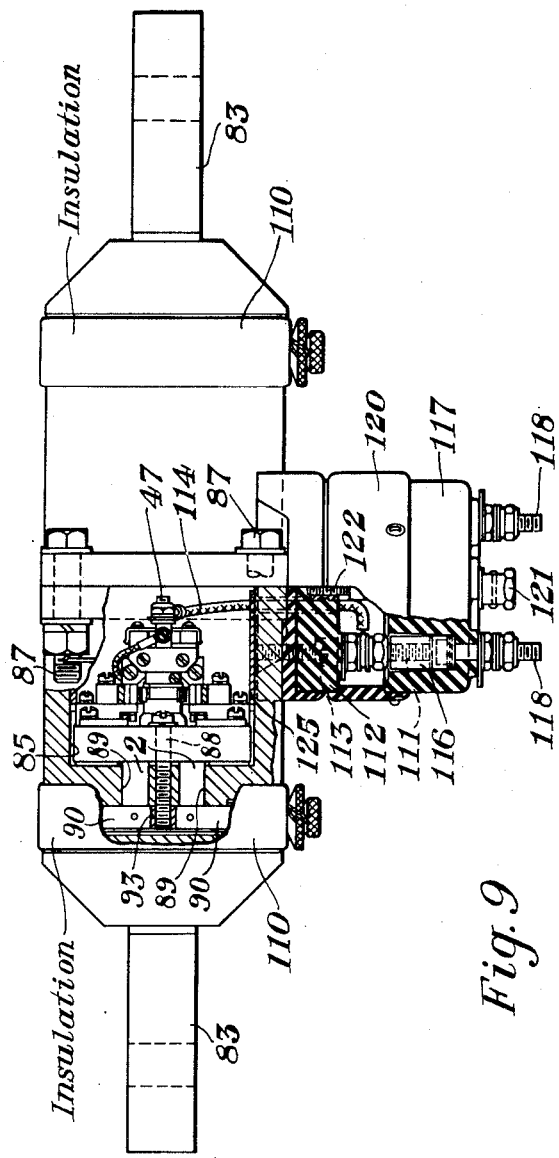
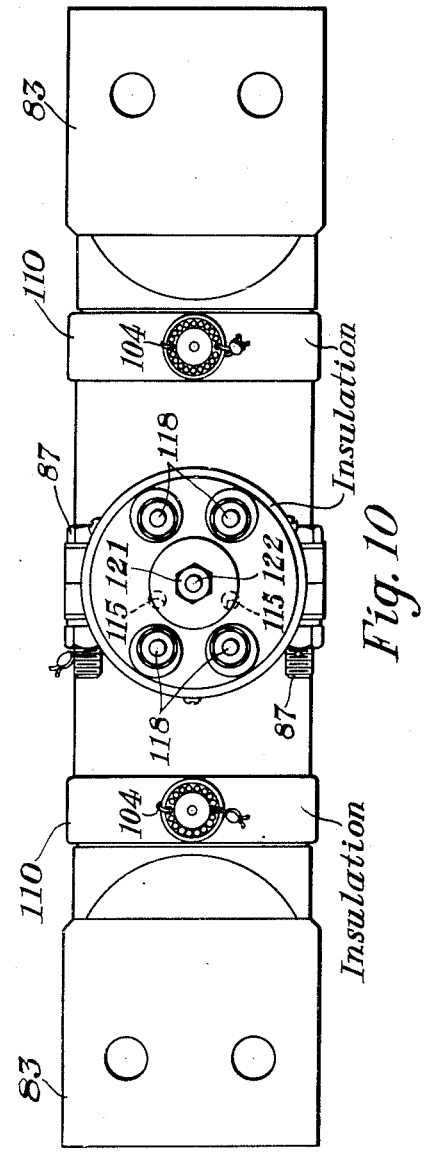
INVENTOR.
Clarence S. Snavely
BY
HIS ATTORNEY Feb. 5, 1952    C. S. SNAVELY    2,584,749
ELECTRICAL RELAY
Filed Aug. 28, 1947    6 Sheets-Sheet 6

INVENTOR.
Clarence S. Snavely
BY
HIS ATTORNEY

Patented Feb. 5, 1952

2,584,749

UNITED STATES PATENT OFFICE 2,584,749

ELECTRICAL RELAY

Clarence S. Snavely, Churchill Borough, Allegheny County, Pa., assignor to Westinghouse Air Brake Company, a corporation of Pennsylvania Application August 28, 1947, Serial No. 771,024

37 Claims. (Cl. 171—97)

My invention relates to electrical relays, and particularly to relays having a high ratio of release to pick-up, adapted for, although in no way limited to, association with a bus bar in such a manner that direct current in the bus bar serves as the exciting current for the relay.

Bus bar relays provide a means for effecting a control or controls directly in response to the magnetic field established by current flowing in the associated bus bar. In certain applications these relays are required to have a high ratio of release to pick-up; to be accurately controlled; to be free from variations in operation due to changes in ambient temperature; and to operate properly under conditions of heavy vibration and shock of the type encountered, for example, when mounted for use on railway locomotives.

It is an object of my invention to provide a novel and improved relay having a high ratio of release to pick-up, employing sturdy, rugged parts arranged so as to operate properly when subjected to irregular shocks and vibrations of relatively large magnitude.

Another object is to provide a compact relay organization adapted for mounting in association with a bus bar so that current in the bus bar serves as the exciting current for the relay.

These stated and other important objects which will become apparent from the following description, are attained by mounting an armature assembly for rotation about an axis passing through its center of mass so as to minimize the effect of shock and vibration on the assembly, by providing a system of balanced forces on the armature assembly with the opposing forces working in common planes so as to minimize the turning moments of the forces relative to the pivots as fulcrums, by employing sturdy, rugged parts assembled together in such a manner as to prevent relative displacement of the parts while freely permitting adjustment of the assembly, by combining the relay parts in an assembly which permits mounting the armature assembly in the neutral space of a hollow conductor forming a part of a load circuit, by supplying the relay armature with flux from the external magnetic field of the conductor, and by providing means for varying the amount of flux supplied to the armature from the external field so as to provide a convenient, accessible means for adjusting the operating range of the relay.

The relay embodying my present invention is an improvement on the direct current responsive means disclosed and claimed in my copending application for Letters Patent of the United States, Serial No. 745,709, filed on May 3, 1947, now abandoned, and provides a control means which is an improvement on the relay systems disclosed and claimed in my copending application for Letters Patent of the United States, No. 732,771, filed March 6, 1947, now Patent No. 2,537,319, issued January 9, 1951.

I shall describe one form of an improved relay embodying my invention, and shall then point out the novel features thereof in claims.

Figure 2:
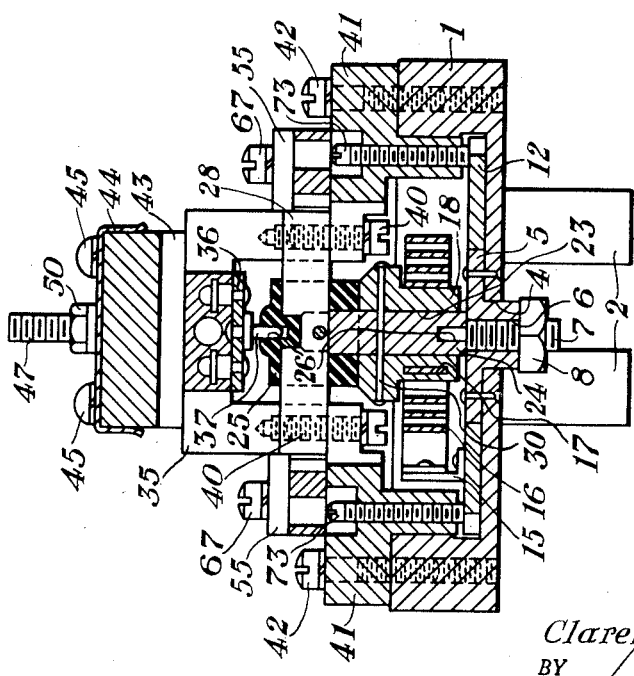
Figure 11:
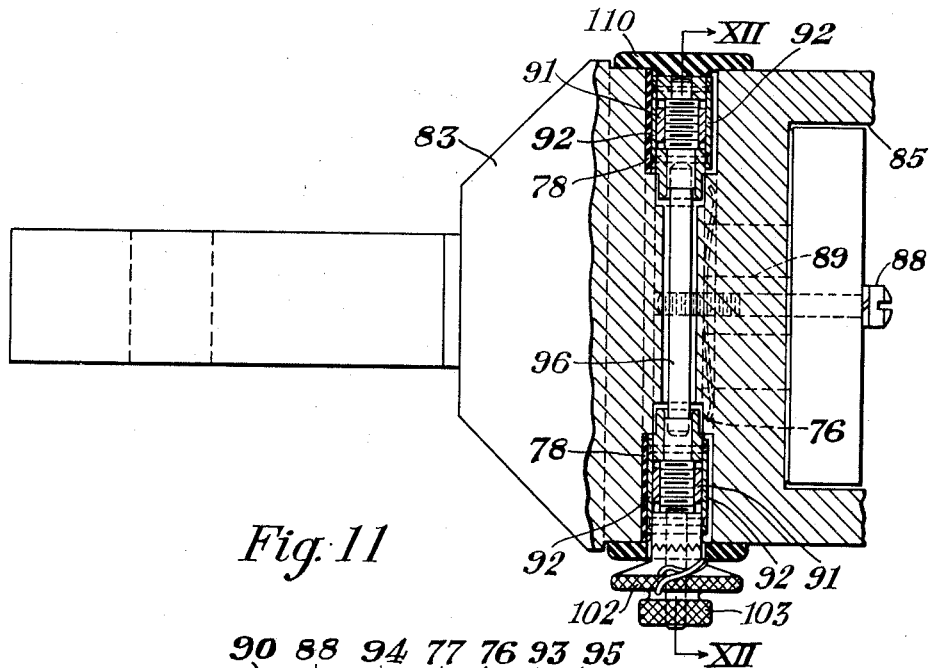
Figure 12:
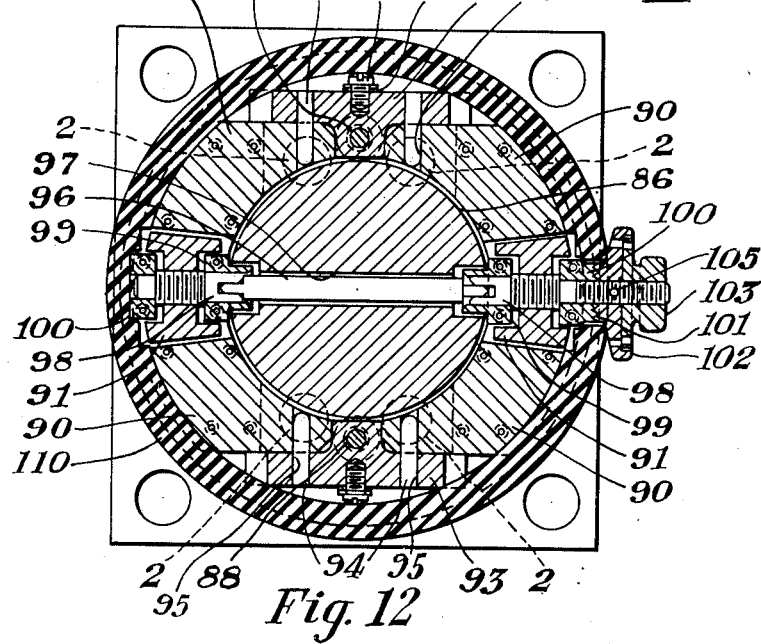

In the accompanying drawings, Fig. 1 is a top plan view, partially sectional, of the operating mechanism of an improved relay embodying my invention, with certain of the parts omitted in order better to illustrate the relationship of the remainder of the parts. Figs. 2 and 3 are sectional views taken substantially on the lines II—II and III—III of Fig. 1. Fig. 4 is a sectional view taken substantially on the line IV—IV of Fig. 3. Fig. 5 is a view showing details of certain parts of the operating mechanism. Fig. 6 is a detail view showing the key 79 in operative relationship with gear plate 12. Fig. 7 is a graphical representation of certain of the torques developed in the relay and illustrating certain principles of operation of my relay. Fig. 8 is a schematic view representing an application of a pair of relays embodying my invention. Fig. 9 is a top view, partially sectional, illustrating the pair of relays embodying my invention as used in the application represented in Fig. 8. Fig. 10 is a front view of the apparatus illustrated in Fig. 9. Fig. 11 is a top view partially sectional showing details of the magnetic strap assemblies. Fig. 12 is a sectional view taken substantially on the line XII—XII of Fig. 11. Figs. 13 and 14 are top and front views, respectively, of a strap assembly represented in Fig. 12.

In each of the several views of the drawings similar reference characters refer to similar parts.

Referring to the drawings, an improved relay embodying my invention comprises an operating mechanism, a relay housing, and energizing means. A preferred form of the operating mechanism is illustrated in Figs. 1-4 inclusive, one form of the relay housing is illustrated in Figs. 8-10 inclusive, while Figs. 11 through 14, inclusive, illustrate one form of the energizing means. The several elements comprising one embodiment of my invention are illustrated in assembled relationship in Fig. 9 for use in a particular application schematically represented in Fig. 8.

Referring first to Figs. 1–4, inclusive, of the drawings, the operating mechanism of a relay embodying my invention is arranged to exert on a rotor mounted for movement between two extreme positions, a system of forces comprised of two opposing sets of forces, one set including a force biasing the rotor to a position intermediate its two extreme positions, and another force biasing the rotor to its nearest extreme position; and the other set including a force biasing the rotor to a selected one of its two extreme positions, and another force resulting from the exciting current in the relay tending to operate the rotor from the biased one position to the other extreme position. The force system is applied to the rotor in planes perpendicular to the axis of rotation and in such a manner that the forces of each set oppose each other in common planes so as to minimize the turning moments of such forces relative to the points of support as fulcrums. The force elements are selected and proportioned so that the resultant torque established on the rotor under a given condition of exciting current in the relay results in operation of the rotor from its released to its picked-up position, and under another condition of energizing current in the relay results in operation of the rotor from its picked-up to its released position, with the magnitude of the other condition of energizing current being a relatively high percentage of the magnitude of the one energizing current.

The various cooperating elements constituting the operating mechanism of my relay are shown in Figs. 1–4 in assembled relationship with the rotor represented in an intermediate position equi-distant from its two extreme positions, while the more important elements of the mechanism can be seen best in an exploded view in Fig. 5. The mechanism comprises a cylindrically shaped frame member 1 (see Fig. 5) which supports in parallel spaced relationship one or more pairs of pole pieces 2, the pole pieces being inserted into and pinned in openings provided in member 1 and projecting outwardly from the rear face of that member. The mounting of pole pieces 2 in member 1 is such that a central bore 3 provided in the front face of member 1 passes through the pole pieces 2 so that a considerable portion of the length of each pole piece is exposed along the inner face of the rim of bore 3. A centrally located opening 4 (see Fig. 2) provided in the bottom of the bore communicates with the rear face of member 1 and has mounted therein a pivot plate 5 provided with a hub extending through opening 4 and a circular flange which rests against and is riveted to the bottom of bore 3. Plate 5 has a through opening 6 in which is threaded a pivot 7 which may be adjustably positioned in the opening and then locked into place by a lock nut 8 screwed on the rearwardly extending portion of pivot 7. The arrangement is such that pivot 7 lies in the central axis of the bore 3 and cylindrical member 1. Other openings 9 (see Fig. 5) provided in member 1 are spaced from the center opening 4 and are provided for a purpose to be explained presently. Another opening 10 provides a communication from the rear face of member 1 to the side of bore 3 and is extended to the front face of the rim of member 1 by an opening 11 of reduced diameter. The openings 10 and 11 have a function that also will be explained in the following description.

A cylindrical gear plate 12 has a center opening adapted to fit around the flange of pivot plate 5 and is provided on its outer edges with gear teeth 13. The rear face of plate 12 is formed with radial slots 14 (see Fig. 6) and the front face has an angle piece 15 secured thereto to which is riveted one end of an inwardly coiled spiral spring 16 having its opposite end shaped to fit into a slot 17 (see Fig. 4) formed in the hub of a non-magnetizable spider 18 provided with radial arms, one for each pair of pole pieces mounted in member 1. Each radial arm of spider 18 carries at its extreme end an armature in the form of a dependent magnetizable shoe 19 of U-shaped configuration suitably secured as by rivets to the arm with the extended legs of the shoe being separated from each other (see Fig. 5) by a portion of the non-magnetizable arm. The upper faces of the shoe legs and the separating portion of the radial arm are shaped to conform to the inner surface of the central bore 3 provided in member 1. Each radial arm has an opening 20 communicating from the rear of the arm to a slot 21 formed on the front. A guide hole 22 in the side of spider 18 communicates with a central opening 23 formed in the spider hub with the opening 23 being provided for receiving a shaft 24 molded into an insulating body member 25. The shaft 24 and body member 25 are provided at their opposite ends with pivot openings 26 disposed in axial alignment. Body 25 has molded therein a plurality of flexible fingers 27 which extend radially outwardly from the axis of the pivot openings 26, and also has molded therein a magnetizable armature member 28 which passes through the rotor axis in a plane common to the fingers 27 to project outwardly on opposite sides of the body. The bottom face of body 25 is formed with a notch which is disposed for alignment with slot 21 provided in the radial arms of spider 18. The body and spider are assembled together by pressing shaft 24 into opening 23 of the spider until the upper faces of the radial arms abut against the lower face of body 25. The two elements assembled in this manner are placed in a suitable mold arranged so that the notch in body 25 is brought into alignment with slot 21 of the radial arms. The openings 20 of the radial arms are left exposed by the mold, and solidifiable material which can be applied in a liquid, molten or plastic condition and which will subsequently harden, is introduced through the holes 20 into the aligned slot and notch. A wide variety of different materials may be used, but I prefer to use 7 per cent antimonial lead because it pours easily when molten, and retains its dimensions while cooling. The spider and body elements are left in the mold until the lead cools, and when the elements are removed from the mold the solidified lead rigidly keys the two elements together. The previously mentioned guide hole 22 in one side of the spider hub 18 is then extended through shaft 24 and the opposite side of the spider hub, and a pin 30 (see Fig. 2) is pressed into the hole to assure maintenance of the established relationship of the spider and body elements. These two elements when assembled together in the manner just explained constitute the rotor of my relay.

Associated with the rotor are U-shaped magnetizable pole pieces 35 which cooperate with magnetizable armature member 28 and serve to support another pivot plate 36 provided with a second pivot 37 (see Fig. 5). The two legs of each pole piece 35 are arranged for disposition on opposite sides of rotor body 25 with the connecting portions of the pole pieces extending over and across the body with sufficient clearance to permit pivot plate 36 to be carried from the connecting portions so as to support pivot 37 for cooperation with pivot opening 26 provided in the upper face of body 25. The confronting faces of the connecting portions of pole pieces 35 are provided with indentations and projections the latter of which may, as shown, be in the form of rivets arranged so that their heads project free of the surfaces of the pole pieces, and pivot plate 36 also is provided with projections as in the form of headed rivets mounted in the plate with the head of each rivet disposed free of the upper face of the plate. The pole pieces 35 are assembled in a mold in proper relationship to cooperate with armature 28 in a manner to be explained hereinafter, and with pivot plate 36 having its upper face abutting against the lower edges of the pole pieces 35 so that the rivets carried by the plate are disposed between the confronting surfaces of the pole pieces. Solidifiable material in its liquid state, such as lead, is then poured into the mold so as to cause the material to flow into the indentations and around the heads of the rivets carried by the pivot plate and pole pieces. The parts are removed from the mold when the material solidifies and pivot plate 36 is then held suspended from the connecting portions of pole pieces 35. Each leg of the pole pieces 35 is drilled and threaded for receiving a tap bolt 40 projecting through aligned openings in a supporting member 41 provided for either end of the pole pieces 35 and in turn supported upon the rim of member 1. The supporting member 41 is formed for lateral stability with a depending portion shaped to conform to the inner surface of the rim of member 1 and with a supporting ledge which is secured to the upper surface of the rim as by tap screws 42 (see Fig. 2). With the pole pieces 35 supported from frame member 1 through supporting members 41, pivot plate 36 is positioned so that its pivot 37 is in direct axial alignment with the other pivot 7 so that pivot openings 26 formed in the opposite ends of the rotor assembly will engage the pivots 7 and 37 to mount the rotor about an axis passing through its center of mass. A permanent magnet 43 provided for supplying flux to the pole pieces 35 is held in magnetic relationship with the pole pieces by means of a clamping member 44 bearing against the upper face of magnet 43 and having dependent ears which prevent lateral displacement of the magnet. Clamping member 44 is suitably secured to the pole pieces 35 as by the medium of screws 45 threaded into support members 46 in turn secured by screws 46a to the pole pieces 35. Each support member 46 is provided with a terminal post 47 sandwiched between two insulating strips 48 fastened by screws 49 to support member 46. The terminal post 47 is threaded at its upper end to receive a terminal nut 50 and has its lower end bifurcated to receive a contact element 51 provided at its lower end with a slot in which is mounted one end of a flexible contact ribbon 52 coiled in a spiral with its other end fastened to a flexible finger 27 as by a contact button 53 riveting together the ribbon and finger. The bifurcated lower ends of terminal post 47 may be drawn tightly together by a bolt 54 for securely clamping contact element 51 in post 47.

Associated with the flexible fingers 27 are contact supports 55 secured by bolts 67 to the upper surface of supporting members 41 and provided with means of cooperating with the fingers 27.

Each contact support 55 has on one end a leg provided with a mold insulating member 68 carrying a threaded bushing 56 receiving a contact terminal 57 provided with a contact face 58 for engaging terminal button 53 of the mating finger 27, the arrangement permitting terminal 57 to be adjustably positioned in its threaded bushing 56 and then locked into place by a nut 59 which also serves to secure a terminal wire to the contact terminal 57. The other end of support 55 also has a leg which may if desired be provided with a contact terminal 57 or as shown may be provided with an adjustable member 60 mounted in a slotted opening in the leg for movement toward or away from the axis of rotation of the rotor.

Armature stops 64, each provided with a dependent leg carrying a core pin 65, are secured as by bolts 66 to the rim of member 1 on either side of each radial arm of spider 18 to limit the rotation of the spider and consequently of the armatures 19 thereby, between two extreme positions defined respectively by the core pins 65.

In assembling the relay operating mechanism, spider 18 and body 25 are secured together in a manner previously explained so that shaft 24 projects beyond the end of the spider hub, and the other end of the spiral spring 16 is forced into hub 17 of the spider and is soldered into place. The assembly of gear plate 12 and the rotor is then lowered into bore 3 so that pivot opening 26 of shaft 24 engages pivot 7, and the central opening of gear plate 12 fits around the flange of pivot plate 5, with the gear plate having its rear face resting against the bottom of bore 3 so that some of the radial slots of the gear plate are exposed by openings 9 of member 1. Armature stops 64 are next secured to the rim of member 1, and then pole pieces 35 carrying pivot plate 36 and fastened to supporting members 41 are slipped across body 25 so that pivot 37 enters pivot opening 26 formed in the upper face of body 25. The members 41 are then bolted to the rim of member 1 along with the contact supports 55 so that the rotor assembly is mounted for rotation about the pivots 7 and 37. The position of pivot 37 will be fixed with respect to the upper rim of member 1, but pivot 7 is adjustable in opening 6 of pivot plate 5 so that by positioning pivot 7 the proper spacing of the pivots can easily be obtained, and then maintained by tightening lock nut 8.

With the elements of the operating mechanism assembled in the manner just described, the magnetizable shoes 19 carried at the ends of each radial arm are disposed in magnetic relationship with the associated pair of pole pieces 2 so as to function as armatures. While one or more pairs of pole pieces 2 and an equivalent number of radial arms for the spider may be employed in my relay, I prefer to use two pairs of pole pieces in order to provide for a balanced system of forces on the rotor, and the particular embodiment of my invention illustrated in the drawings utilizes two of such pairs of pole pieces so that spider 18 has two radial arms extending outwardly from the spider hub. The two pairs of pole pieces 2 are located on opposite sides of and radially equidistant from the axis of rotation of the rotor as defined by the centers of pivots 7 and 37, with the two pole pieces of each pair spaced apart uniformly and as previously mentioned, the bore 3 in member 1 passes through each of the pole pieces so as to expose each of them for a considerable portion of its length. The magnetizable shoes 19 carried at the end of each radial arm conform to the inner surface of bore 3 and the lengths of the radial arms are proportioned so that the pole faces of the magnetizable shoes are disposed adjacent to the pole pieces 2 with clearance between the pole pieces and shoes sufficient freely to permit rotation of the rotor assembly about its pivots. The two pole faces formed at the ends of each magnetizable shoe 19 span the two pole pieces of each pair with the exposed face of each pole piece 2 and the associated pole face of shoe 19 being defined by radii of bore 3 drawn to either side of the exposed face of the pole piece.

The armature stops 34 are secured to member 1 in such a manner that when each radial arm of spider 18 is equi-distant from its two cooperating stops 34, as illustrated in Fig. 4, the pole faces of the magnetizable shoes 19 are displaced counterclockwise with respect to the associated pole pieces 2 so that only one-half of each shoe face confronts the associated pole piece. In other words, a line drawn from the axis of rotation of the rotor to the counterclockwise side of the exposed face of a pole piece 2 passes through the mid point of the pole face of the associated leg of magnetizable shoe 19. This positioning of the parts illustrated in Fig. 4 I shall term the intermediate position because the rotor can rotate in either direction from such position so as to expose a lesser amount of the shoe face to the pole piece when rotated in a counterclockwise direction, or more of the shoe face to the pole piece when rotated in a clockwise direction. Under the conditions assumed above, an equal amount of rotation is permitted in either direction from the intermediate position, and preferably the total amount of rotation between the two extreme positions defined by the armature stops 34 is limited to a small range of values such that when flux is supplied to each pair of pole pieces, in a manner to be explained hereinafter, the torque developed on the rotor due to the flux acting on the magnetizable shoes decreases substantially uniformly according as more of the shoe face is exposed to its associated pole piece. The torque on the rotor may, for example, be represented by the line $a$ of Fig. 7, it being noted that the maximum torque is developed on the rotor when it is in its extreme counterclockwise position where the least amount of shoe face is exposed to the pole pieces, and decreases at a substantially uniform rate as more of the shoe face becomes exposed until a minimum torque is developed when the rotor engages its extreme clockwise stop. The line $b$ of Fig. 7 also illustrates the relationship of the torques developed on the rotor by flux supplied by pole pieces 2 in the various different positions of the rotor, it being noted that line $b$ represents the condition corresponding to a different level of flux in the pole pieces 2, a lower maximum value for the torque being established at the counterclockwise position of the rotor.

The contact terminals 57 and adjustable members 60 carried on support 55 are so adjusted that with the rotor in its intermediate position as illustrated in Fig. 1, the flexible fingers 27 carried by rotor body 25 just clear their associated terminals 57 and adjustable members 60 so that the fingers 27 are unflexed and do not provide any turning moment on the rotor assembly. When, however, the rotor is swung from its intermediate position toward its extreme counterclockwise position, a pair of fingers 27 on opposite sides of body 25 are driven into engagement with the mating pair of contact terminals 57 so that the fingers become flexed to create a torque which tends to restore the rotor to its intermediate position. The fingers 27 are designed to exert on the rotor a torque which increases at a substantially uniform rate as the rotor is driven closer to its counterclockwise stop so that this torque reaches a maximum value when the rotor is in its extreme counterclockwise position. The torque developed by fingers 27 when displaced counterclockwise from its intermediate position may be represented by line $c$ of Fig. 7, which extends between the two vertical lines of Fig. 7 representing respectively the counterclockwise and intermediate positions of the rotor. This torque is sufficient to establish a good electrical contact of low resistance between contact buttons 53 and contact faces 58 of the terminals 57, so that the contacts will be established when the rotor is in its extreme counterclockwise position and will be open when the rotor is in its intermediate position or is swung in the clockwise direction from its intermediate position. In this connection it should be noted that flexible contact ribbons 52 connecting terminal posts 47 to the flexible fingers 27 are arranged and proportioned in such a manner as to minimize the restricting effect of the connecting ribbon on the flexure of the associated finger 27. This is attained by employing a very thin flexible ribbon of considerable length formed in a coil.

When the rotor is displaced in a clockwise direction from its intermediate position the other pair of contact fingers 27 located on opposite sides of the rotor body 25 are driven into engagement with their associated adjustable members 60 so that these fingers become flexed to create a torque which increases uniformly as the rotor approaches its clockwise stops. The torque developed by the fingers 27 on the rotor when it is displaced in the clockwise direction about its intermediate position may be represented by the line $d$ of Fig. 7 extending between the vertical lines representing the intermediate and the clockwise positions of the rotor, it being noted that the declination of this line from left to right represents a selected position of adjustable members 60 relative to the axis of rotation of the rotor and that such declination may be increased or decreased respectively, according as the adjustable members 60 are moved inwardly or outwardly from the selected location, such movement of the member 60 resulting in varying the effective spring length of fingers 27 cooperating with such adjustable members. The members 60 therefore provide an adjustable means for increasing or decreasing the forces exerted on the rotor by the flexible fingers 27 when the rotor is displaced toward its extreme clockwise position. It is to be noted that the fingers 27 and members 60 do not complete any electrical contact, but if such function is required it can easily be furnished by providing contact terminals 57 in place of the adjustable members 60 and by providing a flexible connection between such fingers 27 and suitable terminal posts in the manner shown in Fig. 1 and previously described for the other pair of fingers 27.

The fingers 27, and cooperating terminals 57 and adjustable members 60, therefore functiton not only to establish electrical contacts of low resistance in one extreme position of the rotor (and can be arranged to establish similar contacts in the other extreme position as previously mentioned) but also function to bias the rotor to its intermediate position by developing torques which increase uniformly as the rotor is swung away from its intermediate position toward either extreme position.

The pole pieces 35 which support pivot plate 36 in a manner previously explained are assembled together in such a manner that when the rotor is in its intermediate position illustrated in Fig. 1, the opposite ends of magnetizable member 28 are disposed equi-distant from the confronting legs of the two pole pieces 35. The permanent magnet 43 supplying flux to pole pieces 35 establishes a field between such pole pieces with one of the pole pieces being the one pole and the other pole piece the other pole of such field, so that with armature member 28 equi-distant from the legs of such pole pieces a net resultant force of zero magnitude will be impressed upon the rotor due to the flux acting on magnetizable member 28. When, however, the rotor is swung to its extreme counterclockwise position, then member 28 has its opposite ends disposed adjacent to diagonally opposite legs of the two pole pieces 35 so that the member 28 forms a path of low reluctance for the flux circulating in pole pieces 35, while if the rotor is swung to its extreme clockwise position the opposite ends of member 28 are disposed adjacent to the other two diagonally opposite legs of pole pieces 35. The pole pieces 35 are spaced apart when assembled in the manner previously explained to establish this relationship of member 28 and the legs of the pole pieces in the extreme positions of the rotor.

The flux in the pole pieces 35 establishes on the rotor a torque which varies from a maximum when member 28 occupies a position adjacent to the two oppositely disposed legs of the pole pieces in one extreme position of the rotor, decreases non-uniformly to pass through the zero value when the rotor is positioned in its intermediate position, and then increases non-uniformly to another maximum value when the member 28 is disposed adjacent to the other two opposite legs of pole pieces 35. The torque exerted on the rotor by the field due to permanent magnet 43 may be represented by the curve e of Fig. 7, it being understood that this curve reflects a certain level of magnetization of magnet 43. It is of course evident that the relative values of the torque due to the action of flux on member 28 may be altered by varying the level of magnetization of magnet 43, in which event the general shape of the curve will be maintained although the relative values of the torques will be increased or decreased according as the level of magnetization is increased or decreased, respectively. The magnetic flux acting upon member 28 tends to bias the rotor to the nearest one of its two extreme positions and opposes movement of the rotor away from such extreme position toward its intermediate position. As indicated in Fig. 7, the torque exerted on the rotor due to flux acting on member 28 is opposite in sense to the torque due to the flexible fingers 27 and the relative values of these torques will be selected in such a manner that except in the intermediate position of the rotor, the torque due to magnet 43 always overcomes or exceeds the torque due to the fingers 27. The net resultant of the torque due to the fingers 27 (curves c and d) and to the magnet 43 (curve e) is represented by curve f of Fig. 7, which clearly indicates the degree by which the torque due to magnet 43 exceeds the torque due to the fingers 27. As can be seen in Fig. 5, member 28 and fingers 27 lie in common planes passing at right angles to the axis of rotation of the rotor so that the torques due to magnet 43 and fingers 27 are symmetrical with respect to the pivots 7 and 37 to minimize any unbalanced torque upon these pivots as fulcrums.

The spiral spring 16 carried on gear plate 12 provides a means for biasing the rotor to a selected one of its two extreme positions defined by the armature stops 64. With the relay parts assembled in the manner previously described, when the rotor in its intermediate position illustrated in Fig. 1, and with the gear plate 12 freely movable in bore 3, the plate 12 will assume a position in which spring 16 is unflexed so as not to impose any loading upon the rotor. Gear plate 12 may be moved relative to frame member 1 by means of a toothed key 70 insertable into opening 10 in the rear face of member 1 and having a projecting portion which extends through opening 11 and beyond the rim of member 1. The teeth of gear 70 will engage teeth 13 of plate 12 (see Fig. 6) and a handle 71 may be attached by a collar 72 to the extending portion of key 70 to provide a convenient means for rotating the key. Rotation of the key to cause plate 12 to move in a direction opposite to that in which the rotor is caused to rotate in response to flux supplied from pole piece 2 to the magnetizable shoes 19, causes the rotor to swing in its counterclockwise direction to bring the magnetizable shoes 19 into engagement with core pins 65 of the counterclockwise armature stops 64, thereby preventing further rotation of the rotor. Continued rotation of key 70 in the same direction flexes spring 16 and imposes a spring loading on the rotor which holds it constantly against its counterclockwise armature stops. As will be explained hereinafter, the plate 12 will be rotated sufficiently by key 70 so as to cause the spring loading on the rotor to reach a certain value selected with respect to the energizing force available to supply flux to the pole pieces 2. When this position of plate 12 is determined, the plate will initially be locked into place by screws 73 carried in supporting member 41 effective when tightened down to force the plate 12 firmly against the base of bore 3 to prevent relative movement between the plate and member 1. Solidifiable material in its liquid state, such as molten lead, is then poured into the openings 9 on the rear face of member 1 so as to flow into the radial slots formed in the rear face of plate 12. The material when solidified rigidly keys together plate 12 and member 1 (see Fig. 6) to maintain the established relationship of these two members.

Spiral spring 16 is designed so that over the relatively small range of movement of the rotor between its two extreme positions the spring will impose upon the armature a torque which increases at a substantially uniform rate as the rotor moves away from its extreme counterclockwise position toward its extreme clockwise position. This torque may, for example, be represented by the curve g of Fig. 7, and it will be noted that this torque varies from a minimum value in the extreme counterclockwise position of the rotor to a maximum value at the extreme clockwise position. The spiral spring torque g cooperates with the flexible finger torques c and d, and the torque e due to magnet 43, to establish on the rotor a resultant torque which may be represented by the curve h of Fig. 7. This resultant curve h representing the net torque exerted on the rotor when flux is not supplied from pole pieces 2 to magnetizable shoes 19 indicates that in the absence of countervailing forces the rotor is positioned in its extreme counterclockwise position in which certain of the flexible fingers 27 establish electrical contact with the mating contact elements 57.

As previously mentioned, the pole pieces 2 are arranged to be supplied with flux in such a manner that the flux is caused to traverse first one pole piece of the pair, then the associated magnetizable shoe 19 and then the other pole piece of that pair. The flux may be supplied from a field generated by a coil or coils mounted on the pole pieces 2 extending rearwardly from member 1 (in which case the pole pieces 2 will be suitably connected together by magnetizable members) or as shown in Figs. 9, 11 and 12 and described hereinafter, the pole pieces 2 may be linked by flux from the external field established by current flowing in a bus bar conductor. In either event, I shall assume that the field will supply flux to the pole pieces 2 effective to cause the attractive force exerted on the magnetizable shoes 19 in the counterclockwise position of the rotor to develop a torque on the rotor having a value varying from zero to or above the value represented by the intersection of line $a$ of Fig. 7 with the vertical line representing the position of the rotor against its counterclockwise stop. Under these conditions, the rotor will be maintained in its extreme counterclockwise position until the torque developed on the rotor by flux acting upon magnetizable shoes 19 reaches the value represented by curve $a$ of Fig. 7. This curve is equal to and opposite the maximum value of the resultant torque represented by curve $h$ (as indicated by curve $i$ which represents curve $h$ inverted for comparison with curve $a$) so that any slight increase in the torque developed on the rotor by flux supplied from pole pieces 2 will cause the rotor to operate away from its counterclockwise position to its clockwise position. I shall refer to the level of magnetic energy at which the rotor operates from its counterclockwise to its clockwise position, as being the pick-up level of the relay and assuming that the magnetic energy remains substantially uniform at this level the rotor in moving to its clockwise position will bring the shoes 19 more and more into alignment with the exposed faces of pole pieces 2 so that the attractive effort exerted on the magnetizable shoes by this flux decreases uniformly, as indicated by curve $a$ which slants downwardly from left to right. At the same time, however, the net resultant of the other torques (curve $i$) also decreases as the rotor approaches its clockwise extreme position with the torque due to flux supplied from pole pieces 2 at this pick-up energy level always exceeding the opposing torque represented by the inverted curve $i$. As a result, therefore, once the rotor starts away from its counterclockwise stops its movement to its other extreme position into engagement with the clockwise stops will be carried through with a snap action so that the electrical contacts closed in the counterclockwise position of the rotor will become interrupted, and assuming that the strength of the field supplying pole pieces 2 remains substantially uniform at this level, the rotor will be held in its clockwise position by the difference in the forces represented by curves $a$ and $i$.

With the rotor in its picked-up position corresponding to its extreme clockwise position, if the strength of the field supplying flux to pole pieces 2 should decrease so that the attractive effort on the rotor drops to a point below the opposing torque represented by curve $i$, then the rotor will swing back toward its counterclockwise extreme position to reclose the electrical contacts established between flexible fingers 27 and their mating contact elements 57. I shall term this other level of flux at which the rotor swings away from its picked-up position toward its counterclockwise position the release level of the relay and assuming the flux in pole pieces 2 remains substantially uniform at this level the rotor in operating from its clockwise to its counterclockwise position will be subjected to a constantly increasing torque due to the effect of flux on shoes 19, as indicated by line $b$ of Fig. 7. The resultant of the other torques on the rotor also increases as it moves from the clockwise to the counterclockwise position, and it will be noted that this resultant (curve $i$) always exceeds the torque exerted on the rotor by the flux from pole pieces 2 at the release level of the relay so that the rotor will snap over from its picked-up to its released position.

It will be noted from an inspection of curves $a$, $b$, and $i$ of Fig. 7 that the release level of the relay is a relatively large percentage of its pick-up level. In actual practice I have found that an operating mechanism constructed in accordance with my invention arranged to develop torques having relative values represented by the curves of Fig. 7 will release at a value of 93% of its pick-up value. Other percentages of release may readily be obtained by varying the values of the torques due to the spiral spring 16, flexible fingers 27 and magnet 43, it being noted that the more nearly horizontal curve $f$ becomes the higher the percentage of release, and when the resultant curve $f$ becomes less horizontal the percentage of release is then reduced. This results from the fact that the pick-up and release values are largely determined by the spread between the ends of the resultant curve $f$ so that with only a slight spread between these points a higher ratio of release to pick-up will be obtained than would be the case with a greater spread between these values. A convenient way to vary the release to pick-up ratio is to reduce the magnetization of permanent magnet 43 to the minimum necessary to provide the desired curve $e$ after having established the desired values of the torques due to spiral spring 16, flexible fingers 27 and to flux in pole pieces 2.

In connection with the operation of the relay mechanism, it should be noted that the forces exerted on the rotor by magnetizing flux on the shoes 19 and by spiral spring 16 operate in common planes perpendicular to the axis of rotation of the rotor so that these forces are transferred to the rotor in a manner to minimize the turning moment of these forces relative to the pivots as fulcrums. As previously mentioned, the forces exerted on the armature due to the permanent magnet flux on member 28 and to the flexible fingers 27 likewise are applied in common planes so that all of the operating torques on the rotor are made symmetrical with respect to its pivots. This arrangement is highly advantageous under conditions of vibration and shock and tends toward a long life of operating parts as well as stable calibration characteristics. Also, the rotor assembly comprising spider 18 and body 25 are pivoted about an axis through the center of mass of the assembly to provide dynamic and static balance.

The sturdy, rugged parts employed in the operating mechanism previously described are rigidly assembled together to prevent interference with operation under conditions of extreme vibration and shock. For example, the rotor assembly comprised of the spider 18 and body 25, are not only rigidly keyed together by solidified lead but are also fastened together by pin 30; upper pivot plate 36 is carried from the supporting pole pieces 35 by solidified lead surrounding suitable projections in the two members; while gear plate 12 is held in its selected position relative to frame member 1 by screws 73 and by lead solidified in the holes 9 of the frame member and in the exposed slots formed in the rear face of the gear plate. The other elements are of ample size to withstand shock and jars and are securely fastened to the frame member 1 while the contact structure employs contact fingers and mating contact elements of sufficient size to assure the establishment of electrical contacts of low resistance and ample current carrying capacity. All of these factors contribute toward providing stable operating characteristics under extreme conditions of vibration and shock.

The relay operating mechanism is mounted in a housing and supplied with energizing flux effective to establish the previously mentioned operation of the rotor. The relay housing and energizing means may be of any suitable type in common use, or as shown in Figs. 9–12 inclusive these elements may be arranged to provide a relay capable of use in the application represented in Fig. 8. Referring to Fig. 8, the reference characters R1 and R2 designate a pair of relays constructed in accordance with my invention, automatically controlling a load 80 connected across the terminals of a generator 81 operatively connected to a prime mover 82. The prime mover 82 may comprise, for example, a diesel power plant of a diesel-electric locomotive in which a direct current generator 81 operated by the power plant supplies current to the load 80 which in this case comprises the wheel driving motors of the locomotive. As is customary in these applications, the load supplied by the generator includes a plurality of electrical motors which under some conditions of operation are connected in series, under other conditions are connected in parallel, and under still other conditions are connected in series-shunt or parallel-shunt relations across the direct current generator. The connections of the load motors across the generator in the various relations mentioned above are determined by the value of current drawn by the motors, and in order to determine this factor it has been customary to include in the load circuit a precision shunt of known resistance across which a meter is connected to measure the IR drop, and consequently the current flow in that load circuit. It has been proposed heretofore to shift the load motors automatically from one load connection to another by providing contacts on the meter and controlling associated apparatus by such contacts in the manner shown and claimed in my copending application for Letters Patent of the United States, Serial No. 732,771, filed on March 6, 1947, now Patent No. 2,537,319, issued January 9, 1951, for relay systems.

The relays R1 and R2 represented in Fig. 8 provide an improved means operable directly in response to the magnitude of current in the load circuit for automatically controlling the load 80. Each of these relays, as indicated in Fig. 8, has an operating mechanism (represented by the insulated bodies 25) of the type hereinbefore described mounted in a housing 83 forming a part of or connected in series with the load bus bar, with the rotor of each mechanism normally occupying its counterclockwise position in which the flexible fingers 27 establish electrical contact with the contact terminals 57. One of the relays R1 is arranged and proportioned to pick up, that is, to operate its rotor to open the electrical contact between fingers 27 and contacts 57, at a certain level of load current in the bus bar, and to release (to reclose the contact between fingers 27 and contacts 57) when the load current drops below the release level of the relay as determined by the ratio of release to pick-up previously mentioned. The other relay R2 is arranged and proportioned to pick up at another level of load current, and to release when the load current drops below a given percentage of this level. The relays R1 and R2 may, for example, be arranged to pick up respectively when the load current reaches the values of 1500 and 2100 amperes, and each releases at say 93% of its pick-up value, it being understood that the specific values given above for the pick-up load current levels, and the ratio of release to pick-up, are merely illustrative of the possible ranges of operation of the relays. Under the specific conditions assumed, the relays R1 and R2 may be utilized as shown in Fig. 8 to control load 80 so as to establish a first condition of control when both relays R1 and R2 close their contacts 27—57, a second condition of control when relay R1 opens its contacts 27—57 while relay R2 maintains its contacts 27—57 closed, and a third condition of control when both relays R1 and R2 open their contacts 27—57.

Each housing 83 shown schematically in Fig. 8 is formed on one end with a tang for connection with the heavy metallic bus bar elements 84 connecting load 80 across the generator 81, and has its opposite end provided with a longitudinal hollow opening or bore 85 for receiving the associated relay operating mechanism. A neck portion 86 of reduced diameter is provided for each housing 83 intermediate its two ends for receiving flux collecting means (not shown in Fig. 8), and the two housings 83 are assembled together with the bores 85 in alignment, and are then fastened together by bolts 87 (see Fig. 9) so as to enclose the associated mechanisms. As indicated in Fig. 8, one terminal of generator 81 is connected by bus bar element 84 to the tang of one housing 83, and the other terminal of the generator is connected through bus bar elements 84 and load 80 to the tang of the other housing 83 and assuming that the flow of current is from the left-hand terminal (as viewed in Fig. 8) of generator 81 through the load circuit to the other or right-hand terminal of generator 81, it will be seen that all of the current supplied to load 80 is carried by the two housings 83 in series, and that such current passes through the reduced neck portion 86 of the left-hand housing 83, then divides and is carried around the relay operating mechanisms by the hollow shell of the housings, and then joins to pass through the reduced neck of the right-hand housing. It follows that the relay housings 83 constitute a part of the load circuit and carry all of the current supplied to the load from the generator.

The operating mechanisms of relays R1 and R2 are mounted in the housings 83 as shown in Figs. 9, 10, 11, and 12 to respond to the magnetic field established by the load current carried by such housings. In Fig. 9 the left-hand housing is broken away to show the position of mounting the mechanism in bore 85. The bottom of bore 85 is drilled to provide holes 89 communicating with the exterior of the reduced neck portion 86 and spaced to receive the projecting ends of pole pieces 2 extending rearwardly from frame member 1 of the mechanism. Other holes are also drilled in the bottom of bore 85 communicating with the slot in the housing formed by its reduced neck portion, for permitting bolts 88 to be passed through aligned openings provided in member 1 and then threaded into a member 93 disposed in the slot, for retaining the mechanism in position in its housing 83, as will be made clear presently.

The ends of pole pieces 2 extending rearwardly from frame member 1 project through openings 89 to abut against magnetizable members 90 forming a part of a flux collecting means (see Figs. 9, 11, and 12) mounted around reduced neck portion 86 of the housing. These flux collect-means include two strap assemblies each comprised (see Figs. 13 and 14) of two magnetizable members 90 and a cooperating magnetizable wedge member 91. Non-magnetizable connecting strips 92 riveted respectively to the two members 90 of each strap assembly hold these members spaced apart from each other for permitting insertion between them of the adjustable wedge member 91. The inner edges of the members 90 are shaped to conform to the outer surface of the reduced neck portion 86 of the housing, and the strap assemblies are proportioned so that when assembled around the neck 86 as shown in Fig. 12 the outer end of one member 90 abuts against one pole piece 2 of one of the two pairs of pole pieces mounted in frame member 1, and the outer end of the other member 90 of that assembly abuts against one of the pole pieces 2 of the other pair. The right-hand pole pieces 2 of each pair (as viewed in Fig. 12) are thus connected together through the medium of the two magnetizable members 90 and the cooperating wedge member 91 comprising one of the two strap assemblies, while the other two (left-hand) pole pieces 2 are connected together by the other strap assembly. The strap assemblies when mounted on neck 86 in the manner just described have their adjacent ends spaced apart from each other and are maintained in this spaced relation by non-magnetizable spacing members 93 provided with pins 94 which engage openings 95 provided in the ends of the members 90. The spacing members 93 also are threaded to receive the ends of the bolts 88 which secure frame member 1 in the bore 85 of the associated housing, the arrangement being effective when bolts 88 are tightened down to hold the operating mechanism in its housing and to draw the magnetizable members 90 of the strap assemblies tightly into abutting relation with the ends of the associated pole pieces 2.

Each spacing member 93 is provided with a spring 76 secured to the member by a bolt 77 for assisting in maintaining the strap assemblies properly positioned in the neck of housing 83, the spring being disposed between the associated spacing member 93 and the sidewall of the slot nearest bore 85 of the housing. An insulating strip 78 is provided between the strap assemblies and the other sidewall of the slot for insulating the assemblies from the current carrying housing so as to prevent passage of load current through the strap assemblies.

Each adjustable wedge member 91 and its two associated magnetizable members 90 have their adjacent ends formed with matching tapers, and the two wedge members are connected together by a rod 96 extending through an opening 97 drilled in neck 86 and connected at either end to threaded drive rods 98 mounted in inner and outer guide blocks 99 and 100, respectively. The guide blocks are riveted respectively to the connecting strips 92 of the associated strap assembly, while the wedges 91 are threaded to engage the drive rods 98 and are mounted between the connecting strips 92 for movement toward or away from the neck 86, the strips 92 confining the sides of wedges 91 to prevent them from turning. One of the outer guide blocks 100 has an extension on which are formed teeth 101 which mate with teeth formed on an operating nut 102 carried on an extension of one of the drive rods 98 which is also provided with a locking nut 103, effective when tightened down to lock the teeth of nut 102 into engagement with the teeth formed on guide block 100. The nuts 102 and 103 are drilled with holes some of which match or align in the various different positions of the nuts, to provide a means for inserting a locking wire 104 which when its ends are sealed provides a tell-tale insuring against unauthorized operation of the operating nut 102.

Before attaching and sealing locking wire 104, the nut 103 will be backed off nut 102 which is freely movable along its drive rod 98 and is operatively connected thereto in any suitable manner, as by providing rod 98 with projections 105 mating with slots formed in the hub of nut 102 so that when nut 102 is withdrawn from the teeth of guide block 100, the nut may be turned to rotate its drive rod 98, the connecting rod 96, and the other drive rod 98. The two drive rods 98 are oppositely threaded, that is, one is formed with right-hand and the other with left-hand threads which engage corresponding threads of the associated adjustable members 91 so that rotation of nut 102 will cause both adjustable wedge members 91 to move simultaneously in opposite directions relative to neck 86, both members 91 moving in unison either toward or away from the neck depending upon the direction of rotation of nut 102. This movement will decrease or increase respectively the air gap between wedges 91 and their associated magnetizable members 90 to decrease or increase the reluctance of the magnetic path comprised of the two magnetizable members 90 and the intervening adjustable member 91.

The flux collecting means may be suitably enclosed as by a collar 110, preferably formed of insulating material such as rubber. Connections may be made from the outside of relay housing 83 to the terminals 47 of the mechanism mounted therein, by wires 114 connected to terminals 47 and brought out through openings provided in the sidewall of bore 85 of the housing. The wires 114 may be directly included in the external circuits controlled by the relays, or may as indicated in Fig. 8 be connected to such external circuits by plug coupler means illustrated in Figs. 9 and 10. The plug coupler means comprise mating sets of male and female terminals, one set of such terminals 111 being mounted in an insulating block 112 fastened to the sides of housings 83 by bolts 113 and connected to wires 114 which pass through openings 115 (see Fig. 10) provided in the sidewalls of the housing, and the other set of connectors 116 being carried in a detachable plug coupler 117 provided with terminals 118 for attaching external circuit wires 119 (see Fig. 8).

A dust cover 120 (see Fig. 9) inserted between insulating block 112 and plug 117 fits tightly around the block and plug to provide a dust-proof seal for the mating plug coupler terminals. The various units are assembled together by tightening down a nut 121 threaded onto a bolt 122 carried in block 112 and projecting outwardly from plug 117 through an opening provided therein.

The terminals 118 carried in plug 117 are grouped in two spaced pairs so arranged that plug 117 may be attached to terminals 111 carried by block 112, in either of two positions spaced 180° apart. As indicated conventionally in Fig. 8, the two terminal posts 47 of a relay are connected to diagonally opposite terminals of the plug coupler assembly so that regardless of the position in which plug 117 is attached to the coupler assembly, the same two diagonally opposite terminals 118 of the plug will mate with the two terminals 111 connected to a particular relay, thereby assuring that the external connections to the relays R1 and R2 will always be made with the proper relay terminals 47 in any position in which plug 117 is attached to the mating block member 112.

Each one of the extended portions of the pole pieces 2 projecting through openings 87 in the bottom of hollow housing 83 to abut against the outer end of the associated member 90, effects a continuance of the magnetic path comprised of such abutting member. The mechanisms mounted in housings 83 connected in series in the load circuit will be supplied through the magnetizable pole pieces 2 with flux from the field established around reduced neck portion 86 of the associated housing. The magnitude of this field will be directly proportional to the current supplied to the load through the housings 83. The pole pieces 2 and the associated magnetizable shoes 19 provide a path of relatively low reluctance across the adjacent ends of the two strap assemblies spaced apart by spacing members 93, and a portion of the flux of the external magnetic field surrounding neck 86 will be diverted or shunted through the pole pieces 2 into the hollow bore 85 to pass through the magnetizable shoes 19, thereby exerting on the shoes a force tending to bring the shoe faces into alignment with the exposed faces of the pole pieces 2. At a certain level of current in the relay housing 83, this force on the magnetizable shoes 19 will cause the rotor to operate from its biased counterclockwise position to its clockwise position, thereby opening the contacts 27—57 of the relay. After the relay has picked up to open its contacts 27—57, a decrease in the current value carried by housing 83 below the level determined by the per cent release to pick-up ratio of the relay, will cause the rotor to swing back to its counterclockwise position, as previously explained in detail hereinbefore.

The particular level of current in the housing 83 at which the rotor mounted therein will be picked up, will be determined (within limits, of course) by the adjustment of wedges 91 relative to their associated members 90. If the wedges 91 are positioned near neck 86, the spacing between members 90 and the wedge will be smaller than is the case with the wedges moved away from the neck, consequently the reluctance of the strap assembly varies from a lower to a higher value according to the position of wedge 91 relative to its associated members 90 abutting against the pole pieces 2. The proportion of the flux threading the strap assemblies at any given level of current in housing 83 accordingly may be varied by adjusting the position of wedges 91, so that the magnitude of flux supplied from the strap assemblies to the pole pieces 2 may likewise be varied. The relative dimensions of the members 90 and 91 will be selected with respect to the particular range of operation of the relays so that by slight adjustments of the position of wedges 91, operation of the relay can be obtained at any particular current value over a relatively wide range. The adjustment of the wedges 91 to select the particular current value of operation of the relay will be effected by operating nut 102 in the manner previously mentioned.

It is to be noted that the relay armatures in housings 83 respond directly to the flux established around neck 86 of the housing, and since the strength of this field is directly proportional to the current in the housing, the operation of the relays will not be affected in way by variations in ambient temperature or, in other words, the relays will always respond directly to the value of current in the housings. It should also be noted that the armatures, mounted within the hollow space entirely enclosed by the current-carrying sidewalls of the housing members 83, will respond to the flux diverted or shunted into the hollow space by the pole pieces 2, but will not be affected by current flowing in the housing sidewalls, due to the neutral magnetic space inside of the hollow housings 83. The relay armatures therefore will be operated upon only by flux led into the hollow space of the housings from the external field established around the housing, but will not be affected by current flowing in the conductive sidewall of the housing.

The use of two pairs of pole pieces 2 in a relay embodying my invention not only affords a balanced system of forces on the armature assembly, as previously mentioned, but also minimizes the effect of stray magnetic fields on the relay armature. That is to say, if a stray magnetic field should exist at the point where a relay embodying my invention is mounted, any force exerted on the rotor by such field passing through one of the magnetizable shoes 19 will be substantially balanced out by the force due to such field on the other magnetizable shoe 19, it being assumed that the direction of the stray field through the two shoes will be in the same direction. Additional protection against stray magnetic fields also is provided by means of a thin-walled cylinder 125 of magnetizable material slipped into the bore 85 of each housing around the associated relay operating mechanism to function as a magnetic shield.

In Figs. 8-10 inclusive, I have represented two relays R1 and R2 embodying my invention applied to a power bus bar, but it is to be understood, of course, that either of the represented relays may be employed alone, in which event only one housing 83 will be required and will be bolted to a cover element shaped to enclose the open end of bore 85 and provided with a tang on the opposite end, the cover element replacing the other housing 83. Also, it should be understood that the principle of operation of the relays shown in Figs. 8-12 inclusive, permit the relays to be supplied with flux from fields other than those established around power bus bars. In other words, the magnetizable strap assemblies which connect together one of the pole pieces of each pair, and which are disposed in the magnetic field established around the neck of housing 83, may if desired be disposed in the magnetic field of an electrical coil disposed on such a strap assembly, or in other words the pole pieces 2 may be connected together by magnetizable core members on which are mounted magnetizing coils. In such an event the coil or coils will be energized in such a manner that flux is caused to flow in opposite directions in the two core members so as to pass in series through such cores, the two pole pieces of each pair, and the magnetizable shoes 19. In this construction the operating unit and energizing means may be mounted in a suitable relay housing of common construction.

From the foregoing description it is readily apparent that I have provided a novel and improved form of electrical relay comprised of sturdy, rugged parts with certain of the relay elements maintained against relative displacement by solidified material (such as lead), the moving parts of the device balanced both statically and dynamically so as to avoid undue wear on the pivots and assure proper operation in service, and the forces applied to the rotor arranged symmetrically in order to minimize unbalanced forces. All of these factors contribute toward making a relay embodying my invention stable in operation when subjected to severe vibrations, shocks and jars. The relay design also affords protection against operation due to stray magnetic fields by use of the two pairs of pole pieces cooperating with two magnetizable armatures.

An important advantage of my invention is the method of developing and combining the torques exerted on the relay rotor to obtain the desired resulting operation. The rotary torque developed due to the energizing flux in the relay is balanced against the spiral spring torque, while the spring torques of the flexible fingers work against the torque due to the permanent magnet. The combined resultant torque developed by the relay provides for a snap action between armature positions while affording a high ratio of release to pick-up. The relay is extremely accurate in operation, and is readily adjustable to vary the per cent release ratio by simple adjustments in the magnetization of the permanent magnet.

A further advantage of my invetnion resides in its ease of application as a bus bar relay. The relay design permits of operation in response to flux from an external field surrounding a conductor, and enables the armature to be mounted within the neutral magnetic space of a hollow conductor which carries the energizing current for the relay. The supply of flux to the armature is furnished from means positioned in the external field and adjustable for varying the level of the energizing current to which the relay will respond. This adjustment is independent of the adjustment of the per cent release of the relay. The relay operation is directly responsive to the strength of the external magnetic field, and since this strength is directly proportional to the current, the operation of the relay is entirely independent of variations in ambient temperature, any change in temperature merely varying the amount of heat required to be dissipated by the relay housing.

Although I have herein shown and described only one form of an electrical relay embodying my invention, it is understood that various changes and modifications may be made therein within the scope of the appended claims without departing from the spirit and scope of my invention.

Having thus described my invention, what I claim is:

1. In combination with a hollow current carrying element adapted to carry electric current in a direction such that the magnetic field produced by the current flow is external to the element, a plurality of magnetizable strap assemblies disposed around said element so as to be threaded in series by flux of said external field with the said magnetizable strap assemblies having their adjacent ends separated from each other, each said strap assembly comprising: a pair of magnetizable members maintained spaced apart, a third magnetizable member disposed between the pair of magnetizable members, the adjacent ends of said third and of said pair of magnetizable members of an assembly being formed with matching tapers so as to provide varying air gaps between such adjacent ends depending upon the relative positions of said members, means for simultaneously moving the third magnetizable member of each of the plurality of magnetizable strap assemblies relative to its pair of magnetizable members so as to effect a uniform change in air gaps for each strap assembly, and pole pieces extending through the walls of said conductor into cooperating relation with the adjacent ends of said strap assemblies for conducting flux from said external field into the hollow space inside said conductor.

2. In combination, a conductive element having a longitudinally extending bore, magnetizable members disposed about said element to form two magnetic paths threaded in series by flux when a field is established by current in said element, the adjacent ends of said two magnetic paths being spaced apart, two pairs of magnetizable pole pieces extending from the inside of said bore to the outside of said element each abutting respectively with an end of said magnetic paths, a movable member mounted in said bore, two armatures carried by said movable member for cooperating respectively with the two pairs of pole pieces, said movable member operable between two extreme positions in one of which the armatures provide a path of lower reluctance across the pole pieces than in the other, means for biasing said movable member to its said other extreme position, contact means carried by said movable member for closing contacts in at least one of its two extreme positions and effective to bias said movable member to a position intermediate its two extreme positions, and means coacting with said movable member to bias it to its nearest extreme position by a force exceeding the force exerted on said movable member by said contact means.

3. In an electrical control system for establishing a control in response to electric current supplied to a load from a source of current, a hollow conductor connecting said load with said source for supplying electric current to said load with the current flowing in said conductor in a direction such that the magnetic field produced by the current flow is external to the conductor, relay means housed within the hollow portion of said conductor and including an armature supplied with flux from said external field for operating said relay means, and means operated by said relay means.

4. In a diesel-electric locomotive having a prime mover driving an electrical generator, said locomotive provided with wheel-driving electric motors, a control system for establishing a control in response to current supplied from said generator to said motors, comprising a hollow conductor, means connecting said motors and generator for supplying electric current to the motors and including said hollow conductor arranged so that the current supplied to the motor flows in said conductor in such a direction that the magnetic field produced thereby is external to said conductor, relay means mounted inside said conductor and having an armature included in a magnetic circuit supplied with flux from said external field and responsive to such flux, and means controlled by said relay means.

5. In an electrical relay, in combination, a frame member, an armature member, means carried by said frame member mounting said armature member for movement between two extreme positions, means carried by said frame and armature members biasing said armature member to an intermediate position, a first armature means carried by said armature member, means carried by said frame member cooperating with said first armature means to provide a first magnetic circuit including said first armature means and adapted to be supplied with magnetic flux to bias said armature member to the nearest one of its said two extreme positions, means operatively connected with said frame and armature members biasing said armature member to a selected one of its said two extreme positions, a second armature means carried by said armature member, and other means carried by said frame member cooperating with said second armature means to provide a second magnetic circuit independent of said first magnetic circuit and adapted to be supplied with magnetic flux to operate said armature member to the other of its said two positions.

6. In an electrical relay, in combination, a frame member, an armature member mounted in said frame member for movement between two extreme positions and biased to a selected one of its said two extreme positions, a first armature means carried by said armature member, means carried by said frame member cooperating with said first armature means to provide a first magnetic circuit including said first armature means and adapted to be supplied with magnetic flux to bias said armature member to the nearest one of its said two extreme positions, a second armature means carried by said armature member, and other means carried by said frame member cooperating with said second armature means to provide a second magnetic circuit independent of said first magnetic circuit and adapted to be supplied with magnetic flux to operate said armature member to the other of its said two positions.

7. In an electrical relay, in combination, a frame member, a rotor supported by said frame member for rotation between two extreme positions, pole pieces supported by said frame member, armature means carried by said rotor cooperating with said pole pieces for operating said rotor to one of its said two extreme positions when magnetic flux is supplied to said pole pieces, and means biasing said rotor to the other of its said two extreme positions, said means comprising an adjustable member supported by said frame member so as to permit relative movement between said frame and adjustable members, a spiral spring connected at one end to said rotor and at its other end to said adjustable member, said spring formed and connected so as to urge said rotor to said other extreme position by a force which can be varied by varying the relative positions of said frame and adjusting members, and means carried by said frame member for locking said frame and adjusting members against relative movement.

8. In an electrical relay, in combination, a frame member, a rotor supported by said frame member for rotation between two extreme positions, pole pieces supported by said frame member, armature means carried by said rotor cooperating with said pole pieces for operating said rotor to one of its said two extreme positions when magnetic flux is supplied to said pole pieces, and means biasing said rotor to the other of its said two extreme positions, said means comprising an adjustable member supported by said frame member so as to permit relative movement between said frame and adjustable members, a spiral spring connected at one end to said rotor and at its other end to said adjustable member, said spring formed and connected so as to urge said rotor to said other extreme position by a force which can be varied by varying the relative positions of said frame and adjusting members, and said frame and adjusting members being formed to receive a solidifiable material in its fluid state, whereby said frame and adjusting members can be locked into engagement by the introduction of said material and its subsequent solidification.

9. In combination, a frame member, a rotor pivotally supported by said frame member for rotation between two extreme positions, pole pieces supported by said frame member, armature means carried by said rotor cooperating with said pole pieces for operating said rotor to one of its said two positions when magnetic flux is supplied to said pole pieces, an adjustable member carried by said frame member and disposed between said armature means and said frame member movable relative to said rotor, a spiral spring connected at one end to said rotor and at the other end to said adjustable member, said adjustable member being provided with serrations, a manually operable adjusting member provided with serrations and adapted to be mounted in said frame member with the serrations of both said members in mating engagement, whereby to adjust the position of said adjustable member relative to said rotor when the parts are in assembled relationship.

10. The combination with a hollow housing, of a frame member mounted in said housing, a rotor pivotally supported by said frame member for rotation between two extreme positions, pole pieces supported by said frame member, armature means carried by said rotor cooperating with said pole pieces for operating said rotor to one of its said two positions when magnetic flux is supplied to said pole pieces, an adjustable member carried by said frame member and disposed between said armature means and said frame member movable relative to said rotor, a spiral spring connected at one end to said rotor and at the other end to said adjustable member, and means manually operable from outside said housing for adjusting said adjustable member relative to said rotor when said rotor and adjustable member and frame member are in assembled relationship in said housing.

11. In combination, a frame member, a rotor pivotally supported by said frame member for rotation between two extreme positions, pole pieces supported by said frame member, armature means carried by said rotor cooperating with said pole pieces for operating said rotor to one of its said two positions when magnetic flux is supplied to said pole pieces, an adjustable member carried by said frame member and disposed between said armature means and said frame member movable relative to said rotor, a spiral spring connected at one end to said rotor and at the other end to said adjustable member, said adjustable member being provided with serrations, a removable key provided with mating serrations, said frame member being formed to receive and guide said key with its serrations in engagement with the serrations of said adjustable member, said key being operable when inserted in said frame member to adjust the position of said adjustable member relative to said rotor when said rotor and adjustable and frame members are assembled in operative relationship.

12. In combination, a frame member, a rotor pivotally supported by said frame member for rotation between two extreme positions, pole pieces secured to said frame member providing two pairs of pole faces in spaced confronting relation, an armature carried by said rotor and having its ends disposed between the confronting faces of said pole pieces for connecting diagonally opposite pairs of faces in each of the two extreme positions of said rotor, a magnet connected with said pole pieces, said pole pieces and armature forming a magnetic circuit for flux supplied by said magnet whereby said armature magnetically biases said rotor to its nearest extreme position, means carried by said frame member biasing said rotor to a selected one of its said two extreme positions, another armature carried by said rotor, cooperating pole pieces carried by said frame member, said other armature and cooperating pole pieces providing another magnetic circuit separate and apart from the first mentioned magnetic circuit, and means supplying flux to said other magnetic circuit whereby said rotor is operated to the other of its said two positions.

13. In combination, a frame member, a rotor pivotally supported by said frame member for rotation between two extreme positions, magnetizable pole pieces secured to said frame member providing two pairs of pole faces in spaced confronting relation, an armature carried by said rotor and having its ends disposed between the confronting faces of said pole pieces for connecting diagonally opposite pairs of faces in each of the two extreme positions of said rotor, a magnet connected with said pole pieces, said pole pieces and armature forming a magnetic circuit for flux supplied by said magnet whereby said armature magnetically biases said rotor to its nearest extreme position, contact means comprising spring members and fixed members carried by said frame member and rotor establishing electrical contact in the extreme positions of said rotor and effective to urge said rotor to a position midway between its said two extreme positions, means operatively connected with said rotor and said frame member biasing said rotor to a selected one of its said two extreme positions, another armature carried by said rotor, cooperating pole pieces carried by said frame member, said other armature and cooperating pole pieces providing another magnetic circuit separate and apart from the first mentioned magnetic circuit, and means supplying flux to said other magnetic circuit whereby said rotor is operated to the other of its said two positions.

14. In an electrical relay, in combination, a frame member, a rotor pivotally supported by said frame member for rotation between two extreme positions, biasing means comprising a first armature means carried by said rotor and cooperating pole pieces carried by said frame member providing two pairs of pole pieces in spaced confronting relation with said armature having its ends disposed between the confronting faces of said pole pieces to form a first magnetic circuit adapted to be supplied with flux whereby said rotor is biased to the nearest one of its said two extreme positions, contact means comprising cooperating fingers and fixed members carried by said frame member and rotor establishing electrical contact in at least one of said two extreme positions of said rotor, said contact means biasing said rotor to a position midway between its said two extreme positions, said biasing means and contact means being so located relative to each other and to the axis of rotation of said rotor that the forces exerted thereby on said rotor have substantially equal moments about the points of support of said rotor, whereby to minimize the resultant torque developed by such forces about the points of support, spring means operatively connected with said frame member and said rotor biasing said rotor to a selected one of its said two extreme positions, and electromagnetic means comprising other pole pieces carried by said frame member and a second armature means carried by said rotor cooperating with said other pole pieces to provide a second magnetic circuit independent of said first magnetic circuit and adapted to be supplied with flux to operate said rotor to the other of its said two extreme positions, said electromagnetic means and said spring means with its connections to said frame member and rotor being so located relative to each other and to the axis of rotation of said rotor that the forces exerted thereby on said rotor have substantially equal moments about the points of support of said rotor, whereby to minimize the resultant torque developed by such forces about such points of support.

15. In a relay, a rotor pivotally mounted for movement between two extreme positions, means including a permanent magnet provided with a magnetic circuit carried in part on said rotor magnetically biasing said rotor to the nearest of its said two extreme positions, contact means carried in part by said rotor establishing an electrical contact in the extreme positions of said rotor effective to bias said rotor to an intermediate position, other means biasing said rotor to a selected one of its said two extreme positions, and electromagnetic means provided with a magnetic circuit carried in part on said rotor separate and apart from the magnetic circuit of said permanent magnet, for operating said rotor to the other of its said extreme positions.

16. In a relay, a rotor pivotally mounted for movement between two extreme positions, two magnetizable armature means carried by said rotor and included respectively in two separate and distinct magnetic circuits, a first source of magnetic flux for one of said magnetic circuits biasing said rotor to the nearest one of its said two extreme positions, a second source of magnetic flux for the second of said magnetic circuits for operating said rotor to a selected one of its said two positions, means biasing said rotor to the other one of its said two extreme positions, and contact means operated by said rotor establishing an electrical contact in at least one of the two extreme positions of said rotor and urging said rotor to an intermediate position.

17. In a relay, a hollow conductive housing adapted to carry the exciting current of the relay, a rotor pivotally mounted in said housing for movement between two extreme positions, two magnetizable members carried by said rotor included respectively in two separate and distinct magnetic circuits, a first source of magnetic energy mounted in said housing supplying flux to one of said magnetic circuits, the flux in said first magnetic circuit biasing said rotor to the nearest one of its said two extreme positions, means supplying the second of said magnetic circuits with flux when a field is set up by current in said housing, the flux in said second magnetic circuit tending to operate said rotor to a selected one of its said two extreme positions, means biasing said rotor to the other of its said two extreme positions, and contact means operated by said rotor establishing an electrical contact in said extreme positions and urging said rotor to a position intermediate its said two extreme positions.

18. In a relay armature assembly, a shaft, an insulating body molded on one end of said shaft, the free ends of said shaft and body being adapted to be pivotally supported in axial alignment, flexible fingers molded in said body and extending outwardly therefrom, an armature molded in said body and extending through said body to project on opposite sides thereof, a nonmagnetizable spider provided with a plurality of radial arms, a plurality of magnetizable members one for each radial arm carried at the outer ends thereof, said spider formed with a central opening for receiving said shaft, and means for securing together said shaft and spider when assembled with said shaft projecting through said spider opening.

19. As a new article of manufacture, a relay housing adapted for interposition as a current carrying element in a circuit supplying electrical current from a source to a load, said housing formed of conductive material and provided with a longitudinally extending opening adapted to receive the relay operating mechanism.

20. As a new article of manufacture, a relay housing adapted to be connected as a current carrying element in a circuit supplying electrical current from a source to a load, said housing formed of conductive material with a longitudinally extending opening formed at one end to receive the relay operating mechanism, said housing being formed intermediate its other end and said opening with a reduced neck portion.

21. In an electrical relay, a housing of conductive material adapted to be connected as a current carrying element in a circuit supplying electrical current from a source to a load, and an armature mounted in said housing and responsive to current carried by said housing.

22. In an electrical relay, a hollow conductor, and an armature mounted in said conductor and responsive to the field set up when current flows in said conductor.

23. In an electrical relay, a hollow conductor, an armature mounted in said conductor for movement between two extreme positions and biased to one of said positions, and means linking said armature with the field set up when current flows in said conductor, for operating said armature to the other of its said two positions.

24. In an electrical circuit supplying electric current to a load, two relay housings each formed of electrically conductive material and having an opening extending from one end of the housing toward the other, said relay housings secured together with the ends provided with openings in abutting relation and with their opposite ends connected respectively in said load circuit, whereby said two housings are included in series in said load circuit and carry the load current in such a direction that the magnetic field produced by the current flow is external to the housings, two relay means mounted respectively inside said two housings and each including an armature, and means associated with each of said housings for diverting flux from the field external to the housing into said opening and through the associated armature for operating that armature.

25. A relay comprising, in combination, a housing of conductive material adapted to be connected at its opposite ends in a circuit supplying electrical current from a source to a load, said housing functioning as a current carrying element when current is supplied from the source to the load, said housing being provided with an opening extending from one end of the housing toward the other, an armature mounted in said opening, and means linking said armature with the field set up when current flows in said housing.

26. A relay comprising, in combination, a housing of conductive material adapted to be connected at its opposite ends in a circuit supplying electrical current from a source to a load, said housing functioning as a current carrying element when current is supplied from the source to the load, said housing provided with an opening extending from one end of the housing toward the other, an armature mounted in said opening, a magnetizable member disposed about said housing between the inner end of said opening and said other end of said housing, said magnetizable member arranged to provide a magnetic circuit including an air gap for the flux set up when current flows in said housing, and means magnetically connecting said armature across said air gap.

27. A relay comprising, in combination, a housing of conductive material adapted to be connected at its opposite ends in a circuit supplying electrical current from a source to a load, said housing functioning as a current carrying element when current is supplied from the source to the load, said housing provided with an opening extending from one end of the housing toward the other, an armature mounted in said opening, a plurality of magnetizable members disposed about said housing between its said other end and the inner end of said opening, said magnetizable members disposed to be threaded in series by flux set up when current flows in said housing, and arranged to provide a magnetic circuit including an air gap for such flux, and pole pieces extending from within said opening to said magnetizable members connecting said armature across said air gap.

28. A relay comprising, in combination, a housing of conductive material adapted to be connected at its opposite ends in a circuit supplying electrical current from a source to a load, said housing functioning as a current carrying element when current is supplied from the source to the load, said housing provided with an opening extending from one end of the housing toward the other, an armature mounted in said opening, a plurality of magnetizable members disposed about said housing between its said other end and the inner end of said opening, said magnetizable members disposed to be threaded in series by flux set up when current flows in said housing, and arranged to provide a magnetic circuit including an air gap for such flux, means for adjusting said magnetizable members relative to each other for varying the reluctance of said magnetic path, and pole pieces extending from within said opening to said magnetizable members connecting said armature across said air gap.

29. A relay comprising, in combination, a housing of electrical conducting material adapted to be connected at its opposite ends in a circuit supplying electrical current from a source to a load, said housing being provided with an opening extending from one end of said housing toward the other, a movable member mounted in said opening for movement between two extreme positions and biased to one such position, a plurality of armatures carried by said movable member within said opening, a plurality of magnetizable members disposed about said housing between its said two ends, said magnetizable members disposed to be threaded in series by flux set up when current flows in said housing, and arranged to provide a magnetic circuit for said flux including a plurality of air gaps one for each of said armatures, means for adjusting said magnetizable members simultaneously for varying the reluctances of the magnetizable members, and a plurality of pairs of pole pieces one for each armature extending from within said opening to said magnetizable members, each pair of pole pieces magnetically connecting its associated armature across the associated air gap, whereby said movable member is operated to the other of its two positions by flux supplied to said armatures when a field is established by current in said housing.

30. In a relay, in combination, a hollow conductor adapted to carry the exciting current for the relay in a direction such that the magnetic field produced by the current flow is external to the conductor, a magnetic circuit for the flux of said external field comprising magnetizable members disposed around said conductor so as to be threaded in series by said flux with said magnetizable members having their adjacent ends separated from each other by air gaps, a rotor mounted inside said hollow conductor for rotation between two extreme positions, an armature mounted on said rotor, pole pieces extending through the walls of said conductor and forming with said armature a magnetic circuit connected across said air gaps through which flux from said external field is diverted through said armature for operating said rotor to one of its two positions, means biasing said rotor to the other one of its said two extreme positions, contact means operated by said rotor establishing electrical contact in the extreme positions of said rotor and tending to urge said rotor to a position midway between its extreme positions, and means biasing said rotor to the nearest of its said two extreme positions.

31. In a relay, a housing of conductive material adapted to be connected at its opposite ends in a circuit supplied with electrical current, magnetizable members disposed about said housing and arranged to provide a magnetic circuit including an air gap for the flux set up when current is supplied to said housing, said housing being formed with an opening extending from one of its ends toward the other, two pole pieces engaging the opposite ends of said air gap, said pole pieces extending from said magnetizable members through said housing into said opening, and a relay means mounted entirely within said opening, said relay means including a rotor supported for movement between two extreme positions and biased to one such position, an armature carried by said rotor cooperating with said two pole pieces for operating said rotor against its bias to the other of said two positions in response to current supplied to said housing, contact means operated by said rotor establishing electrical contact in the extreme positions of said rotor and biasing said rotor to a position midway between its said extreme positions, and means biasing said rotor to the nearest of its said two extreme positions.

32. A relay comprising a housing of electrical conducting material adapted to be connected at its opposite ends in a circuit supplying electrical current from a source to a load, said housing being provided with an opening extending from one end of said housing toward the other, a rotor mounted in said housing for operation between two extreme positions, an armature carried by said rotor, magnetizable elements disposed about said housing between its two ends and arranged to provide a magnetic circuit including an air gap for the flux set up when current is supplied to said housing, pole pieces extending through said housing connecting said armature across said air gap, whereby said rotor is operated to one of its said two positions when current is supplied to said housing, means biasing said rotor to the other of its said two positions, contact means operated by said rotor establishing electrical contacts in the extreme positions of said rotor and biasing said rotor to a position midway between its extreme positions, and means biasing said rotor to the nearest of its said two positions.

33. In a relay comprising a housing of electrical conducting material adapted to be connected at its opposite ends in a circuit supplying electrical current from a source to a load, said housing being provided with an opening extending from one end of the housing toward the other, a rotor mounted in said opening for operation between two extreme positions, a plurality of armatures carried by said rotor, magnetizable members disposed about said housing to provide a magnetic circuit for the flux set up when current is supplied to said housing, said members arranged to provide a plurality of air gaps in said magnetic circuit one for each armature, a pair of pole pieces provided for each of said armatures, connecting its associated armature across the respective air gap, whereby said rotor is operated to one of its said two positions in response to current supplied to said housing, means for adjusting each of said magnetizable members simultaneously for varying the reluctance of said magnetic circuit, means biasing said rotor to the other of its said two positions, contact means operated by said rotor establishing electrical contacts in the extreme positions of said rotor and biasing said rotor to a position midway between its said extreme positions, and means biasing said rotor to the nearest one of its said two extreme positions.

34. In combination, a hollow conductor adapted to carry electric current in a direction such that the magnetic field produced by the current flow is external to the conductor, an armature mounted inside said conductor, a magnetic circuit including said armature for diverting flux from said field through said armature for operating the armature, and means controlled by said armature.

35. In combination, a hollow conductor adapted to carry electric current in a direction such that the magnetic field produced by the current flow is external to the conductor, an armature mounted in said conductor, pole pieces extending through the walls of said conductor, a magnetic circuit including said pole pieces and said armature for diverting flux from said field through said armature for operating the armature, and contact means operated by said armature.

36. In combination, a hollow conductor adapted to carry current in a direction such that the magnetic field produced by the current flow is external to the conductor, a magnetic circuit for the flux of said external field comprising magnetizable members disposed relative to said conductor to be threaded in series by said flux with said magnetizable members separated from each other by air gaps, a rotor mounted inside said hollow conductor for rotation between two extreme positions, an armature means mounted on said rotor, pole pieces extending through the walls of said conductor and forming with said armature means a magnetic circuit connected across said air gaps through which flux from said external field is diverted through said armature means for operating said rotor to one of its two positions, means biasing said rotor to the other one of its said two extreme positions, and contact means operated by said rotor establishing electrical contact in at least one of the extreme positions of said rotor.

37. In a relay comprising a housing of electrical conducting material adapted to be connected at its opposite ends in a circuit supplying electrical current from a source to a load, said housing being provided with an opening extending from one end of the housing toward the other, a rotor mounted in said opening for operation between two extreme positions, a plurality of armatures carried by said rotor, magnetizable members disposed about said housing to provide a magnetic circuit for the flux set up when current is supplied to said housing, said members arranged to provide a plurality of air gaps in said magnetic circuit one for each armature, a pair of pole pieces provided for each of said armatures, connecting its associated armature across the respective air gap, whereby said rotor is operated to one of its said two positions in response to current supplied to said housing, means biasing said rotor to the other of its said two positions, and contact means operated by said rotor establishing an electrical contact in at least one of the extreme positions of said rotor.

CLARENCE S. SNAVELY.

REFERENCES CITED

The following references are of record in the file of this patent:

UNITED STATES PATENTS

| Number | Name | Date |
|---|---|---|
| 558,256 | Bush | Apr. 14, 1896 |
| 756,167 | Hewlett | Mar. 29, 1904 |
| 1,202,446 | Speed | Oct. 24, 1916 |
| 1,706,937 | Parham | Mar. 26, 1929 |
| 1,847,012 | Lavet | Feb. 23, 1932 |
| 1,858,876 | Bossart | May 17, 1932 |
| 1,913,826 | Blosser | June 13, 1933 |
| 2,057,605 | Blosser | Oct. 13, 1936 |
| 2,092,068 | Hoffman | Sept. 7, 1937 |
| 2,115,836 | Zupa | May 3, 1938 |
| 2,140,604 | Snavely | Dec. 20, 1938 |
| 2,145,821 | Wallace | Jan. 31, 1939 |
| 2,202,720 | Beeman | May 28, 1940 |
| 2,217,162 | Ducati | Oct. 8, 1940 |
| 2,294,484 | Snavely | Sept. 1, 1942 |
| 2,300,822 | Wells | Nov. 3, 1942 |
| 2,373,465 | Douglass | Apr. 10, 1945 |
| 2,439,970 | Fox | Apr. 20, 1948 |

FOREIGN PATENTS

| Number | Country | Date |
|---|---|---|
| 371,330 | Great Britain | Oct. 17, 1929 |